Figure 1:
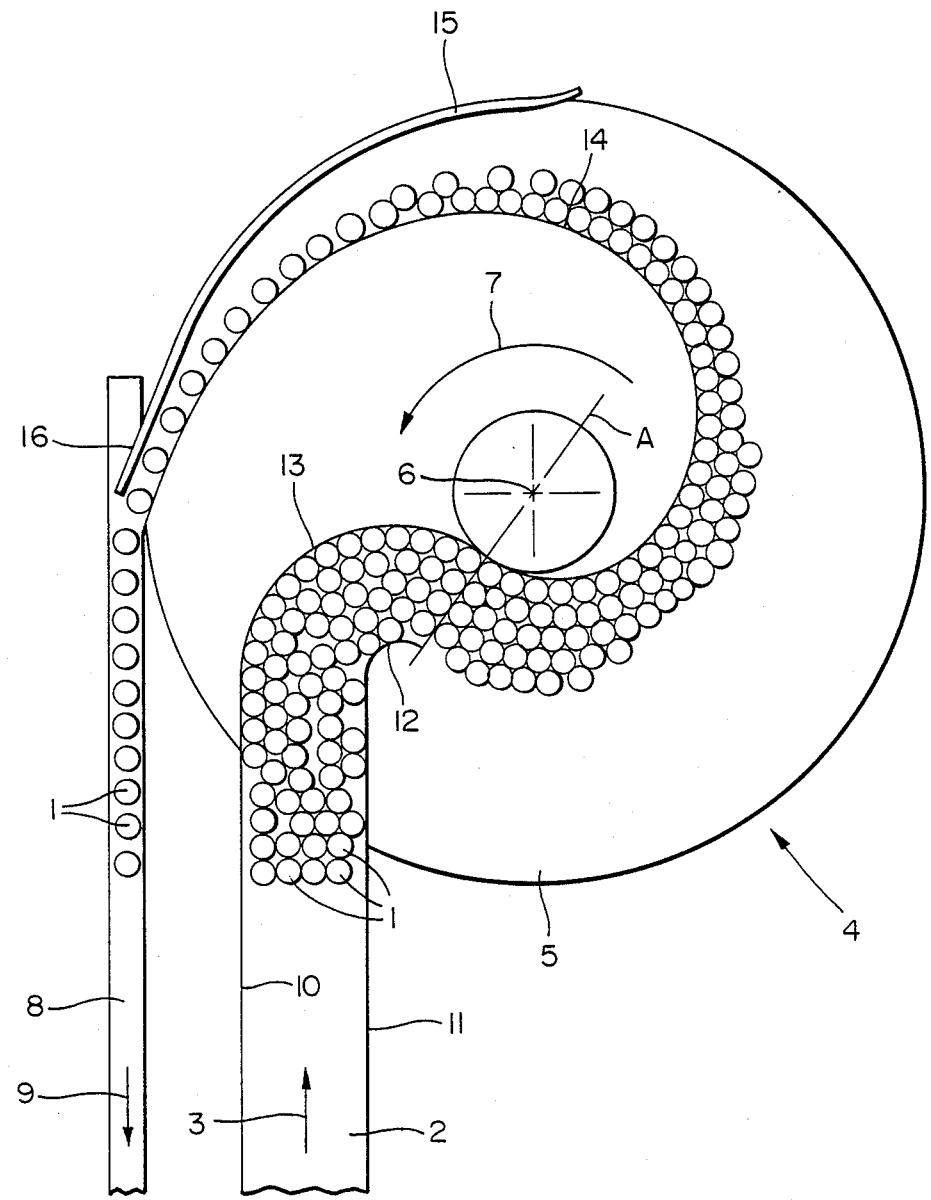

United States Patent [19]

Limoni

[11] Patent Number: 4,925,003

[45] Date of Patent: May 15, 1990

[54] APPARATUS FOR CONVERTING A MULTI-ROW STREAM OF UPRIGHT ARTICLES, IN PARTICULAR BOTTLES, TO A SINGLE ROW

[75] Inventor: Alfredo Limoni, Parma, Italy

[73] Assignee: Simonazzi A: & L. S.p.A., Parma, Italy

[21] Appl. No.: 265,597

[22] Filed: Nov. 1, 1988

[30] Foreign Application Priority Data

Dec. 4, 1987 [IT] Italy .................. 3718 A/87

[51] Int. Cl.$^5$ ............................................. B65G 47/26
[52] U.S. Cl. ..................... 198/452; 198/453
[58] Field of Search ............... 198/449, 450, 452, 453, 198/605, 608, 611, 803.16

[56] References Cited

U.S. PATENT DOCUMENTS 2,389,496  11/1945  Gagnon et al. .............. 198/608 X
4,815,580  3/1989  Schanz et al. .............. 198/453 X

FOREIGN PATENT DOCUMENTS 0635011  11/1978  U.S.S.R. ..................... 198/453
1310296  5/1987  U.S.S.R. ..................... 198/452
2055734  3/1981  United Kingdom ............ 198/461

Primary Examiner—Robert J. Spar
Assistant Examiner—Lyle Kimms
Attorney, Agent, or Firm—Fleit, Jacobson, Cohn, Price, Holman & Stern

[57] ABSTRACT

An apparatus for converting a multi-row stream of upright articles into a single row comprises a rectilinear supply conveyor provided with guide surfaces, an intermediate conveyor consisting of a rotating surface, a removal conveyor, and a frame-fixed guide surface which, in the direction of rotation of the rotating surface, extends spirally outwardly and intercepts the articles. The rotating surface of the intermediate conveyor is a planar disc. Between the supply conveyor and the intermediate conveyor, two parallel guide surfaces are provided. One of the guide surfaces extends in an arc opposite to the spiral arc of the frame-fixed guide surface in a direction towards the center of the disc, and thereafter merges into the spiral arc of the fixed frame guide surface.

1 Claim, 5 Drawing Sheets

APPARATUS FOR CONVERTING A MULTI-ROW STREAM OF UPRIGHT ARTICLES, IN PARTICULAR BOTTLES, TO A SINGLE ROW

The invention relates to an apparatus for converting a multi-row stream of upright articles, in particular bottles, into a single row comprising a rectilinear supply conveyor provided with guide surfaces, an intermediate conveyor consisting of a rotating surface, a removal conveyor and a frame-fixed guide surface which in the direction of rotation of said surface extends spirally outwardly and intercepts the articles.

Such an apparatus is known from DE-PS 3,500,660. In the known apparatus a multi-row stream of upright bottles is moved on a rectilinear supply conveyor provided with guide faces. The rectilinear region of the supply conveyor is followed by a circular arcuate region which extends over an angle range of 90°. Disposed in the center point of the circular arcuate section of the supply conveyor is the center point of the rotating surface, the outer circular boundary of which is tangential to the end of the rectilinear region of the supply conveyor and which adjoins the inner portion of the circular arcuate region of the supply conveyor. A frame-fixed outer guide surface running spirally inwardly extends over the circular region of the supply conveyor. A further inner frame-fixed guide surface starts at the end of the rectilinear region of the supply conveyor, extends from there approximately semicircularly to the center point of the supply conveyor and then continues as substantially spirally outwardly running guide surface. At the side of the intermediate conveyor opposite the circular region of the supply conveyor a removal conveyor partially surrounding the intermediate conveyor is arranged and carries away the single-row bottle stream produced by the intermediate conveyor.

U.S. Pat. No. 1,130,132 discloses an apparatus for converting a multi-row stream of upright articles to a single row in which said articles are brought onto a circular intermediate conveyor having a conical surface. On the side of the intermediate conveyor lying opposite the supply region a short guiding surface is disposed and is spaced from the outer boundary face of the supply conveyor such that between the two guide surfaces there is room for exactly one row of articles. The apparatus known from U.S. Pat. No. 1,430,132 has the following disadvantages: firstly, the articles to be singled out must in some cases run round the intermediate conveyor several times before they are carried off in a single row stream; the apparatus thus does not operate efficiently. Secondly, the articles touch each other on the removal conveyor; thus, between the articles arranged in a single row there are no intermediate spaces as may be necessary for subsequent further processing.

From U.S. Pat. Nos. 3,049,215 and 2,941,651 apparatuses are known for converting a multi-row stream of articles, in particular ore and rock lumps, in which above an intermediate conveyor constructed as conical rotating surface a frame-fixed spirally outwardly extending guide surface is arranged. The spiral guide surface, seen from the articles to be separated, is not on the "peak side" of the conical rotating surfaces of the intermediate conveyor but on the "trough side" thereof. Consequently, the articles to be separated are also not pushed off the guide surface. The movement of the articles along the spiral guide surface is on the contrary due to the fact that the conical face of the intermediate conveyor is inclined so steeply that in cooperation with the centrifugal force an adequately pronounced movement of these articles outwardly takes place.

All the known apparatuses are of relatively complicated construction. Furthermore, they permit only a limited throughput rate.

The problem underlying the invention is therefore to provide an apparatus of the type indicated at the beginning which is of simpler construction than known apparatuses and which permits a higher bottle throughput.

According to the invention this problem is solved in that the rotating surface of the intermediate conveyor is a planar disc.

It has been surprisingly found that it is not necessary to make the surface of the intermediate conveyor conical but that it suffices to use a planar disc. This substantially simplifies the production. Furthermore, the apparatus according to the invention operates particularly effectively so that a great number of bottles can be separated per unit time. Practical tests have shown that a throughput 80000 bottles per hour can be achieved.

An advantageous further development of the invention is characterized in that between the supply conveyor and the intermediate conveyor two parallel guide surfaces are provided of which the one extends in an arc opposite to the spiral arc in the direction towards the center of the disc and thereafter merges into the spiral. The multi-row bottle stream is thereby first brought into the vicinity of the center of the rotating surface of the intermediate conveyor. Up to this time said multi-row bottle stream is substantially retained as such. The separation then begins from the start of the spirally outwardly extending region of the guide surface onwards. The spiral can extend over an angular region of more than 180°, in particular more than 270°. This results firstly in good utilization of a predetermined disc diameter and secondly in a uniform careful continuous separation.

Another advantageous further development of the invention is characterized in that the guide surfaces extend in the end region of the supply conveyor and in the initial region of the intermediate conveyor in radial direction and towards the center point of the disc of the intermediate conveyor.

Figure 2:
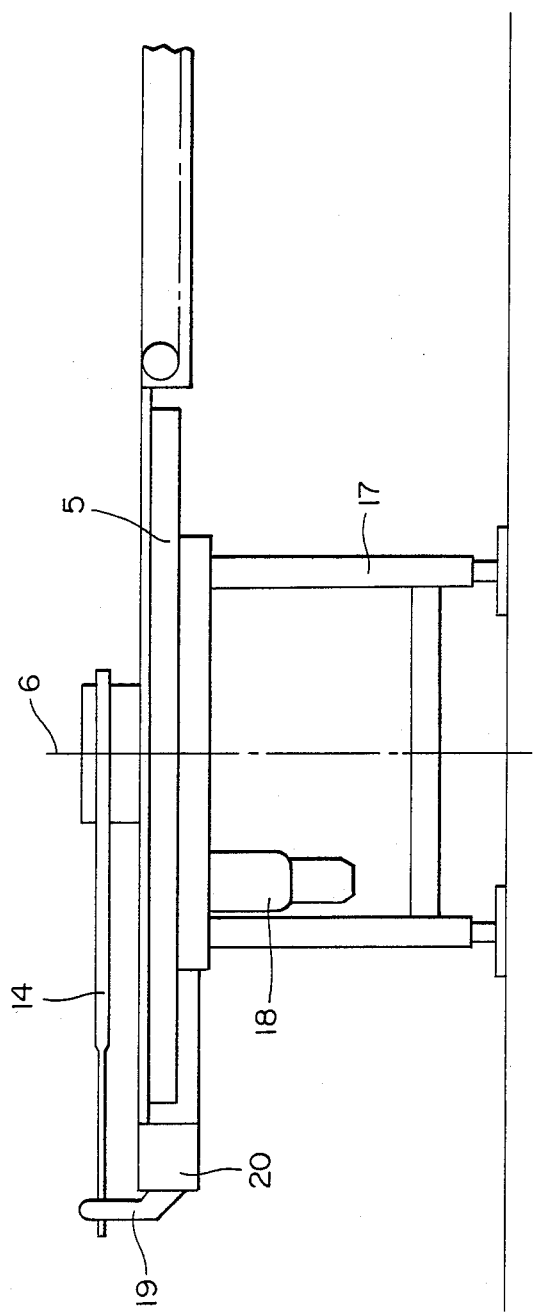

Examples of embodiment of the invention will be explained hereinafter in detail with reference to the attached drawings, wherein:

FIG. 1 is a view from above of an embodiment of the apparatus according to the invention, FIG. 2 is a view from the side of an apparatus according to the invention and FIGS. 3-7 are further embodiments viewed from above.

In the illustration of FIG. 1 the bottles 1 are moved on the supply conveyor 2 in the direction of the arrow 3. The bottles 1 form on the supply conveyor 2 substantially four to five rows.

The intermediate conveyor is denoted as a whole by 4. It consists of a planar circular disc 5 which rotates about its center point 6 in the direction of the arrow 7. The removal conveyor 8 adjoins the disc 5 of the intermediate conveyor 4 tangentially and moves rectilinearly in the direction of the arrow 9.

The following frame-fixed guide surfaces are provided: the rectilinear supply conveyor is defined by two parallel spaced-apart guide surfaces 10, 11. The right guide surface 11 of the supply conveyor 2, seen in the conveying direction 3, extends beYond the edge of the disc 5 of the intermediate conveyor 4 and terminates with an arcuate section 12 extending over about 135°. The left guide surface 10, seen in the conveying direction 3, extends in an arc 13 in the direction towards the center 6 of the disc 5. The arc 13 also extends over about 135°. An imaginary line A drawn through the ends of the arcs 12 and 13 runs through the center 6 of the disc. Where the imaginary line intersects the arc 13 is also where the guide surface 14 originates or begins. A frame-fixed guide surface 14 extending spirally outwardly in the direction 7 of rotation of the surface 5 and pushing the bottles 1 aside adjoins the arc 13. Said spiral 14 extends over an angular region of about 315°. Bottles 1 standing on the disc 5 and rotating therewith run onto the spirally outwardly extending guide surface 14 and are pushed by the latter outwardly with a radial component. Since the tangential speed increases with increasing radial spacing from the center point 6 the bottles are increasingly separated until in the region of the spiral 18 a single bottle row is present in which moreover the bottles are also spaced apart, i.e. moved "pressureless". This singlerow bottle stream is then transferred by the guide surface 14 and the guide surface 15 to the removal conveyor 8. The guide surface 15 extends over an angular region of about 90° concentrically to the center point 6. Provided at the end of the guide surface 15 is a short outwardly directed portion 16 for permitting transfer of the bottle row to the removal conveyor 8. It is obvious that the speed of the removal conveyor 9 must be considerably higher than that of the supply conveyor 2. In the example of FIG. 1 the speed of the removal conveyor 8 is about five times as high as that of the supply conveyor 2.

The arc 13 runs oppositely to the spiral arc 14. Due to this configuration and the fact that the supply conveyor 2 extends in spaced relationship inwardly of the center 6 of the disc 5 an optimum utilization of the disc is achieved and a very large angular range of the supply conveyor 14 is provided. If the spiral 14 pushing the bottles aside can extend over a large angular region it is possible to make the spiral 14 less steep and relatively flat. This causes the separation operation to take place less abruptly and this again increases the bottle throughput.

The arrangement shown in FIG. 1 also has the special feature that the supply conveyor 2 and removal conveyor 8 are directed opposite to each other in parallel with slight distance apart.

FIG. 2 shows an apparatus according to the invention in side elvation. The disc 5 is rotatably mounted on a frame 17 about the axis 6. Beneath the disc 5 is the drive 18 thereof. At the outer edge of the disc 5 an interception plate 19 is provided by which bottles which fall over are prevented from dropping downwardly off the disc 5. The bottles which have fallen over can then be collected in the trough 20 and from there carried away.

Figure 3:
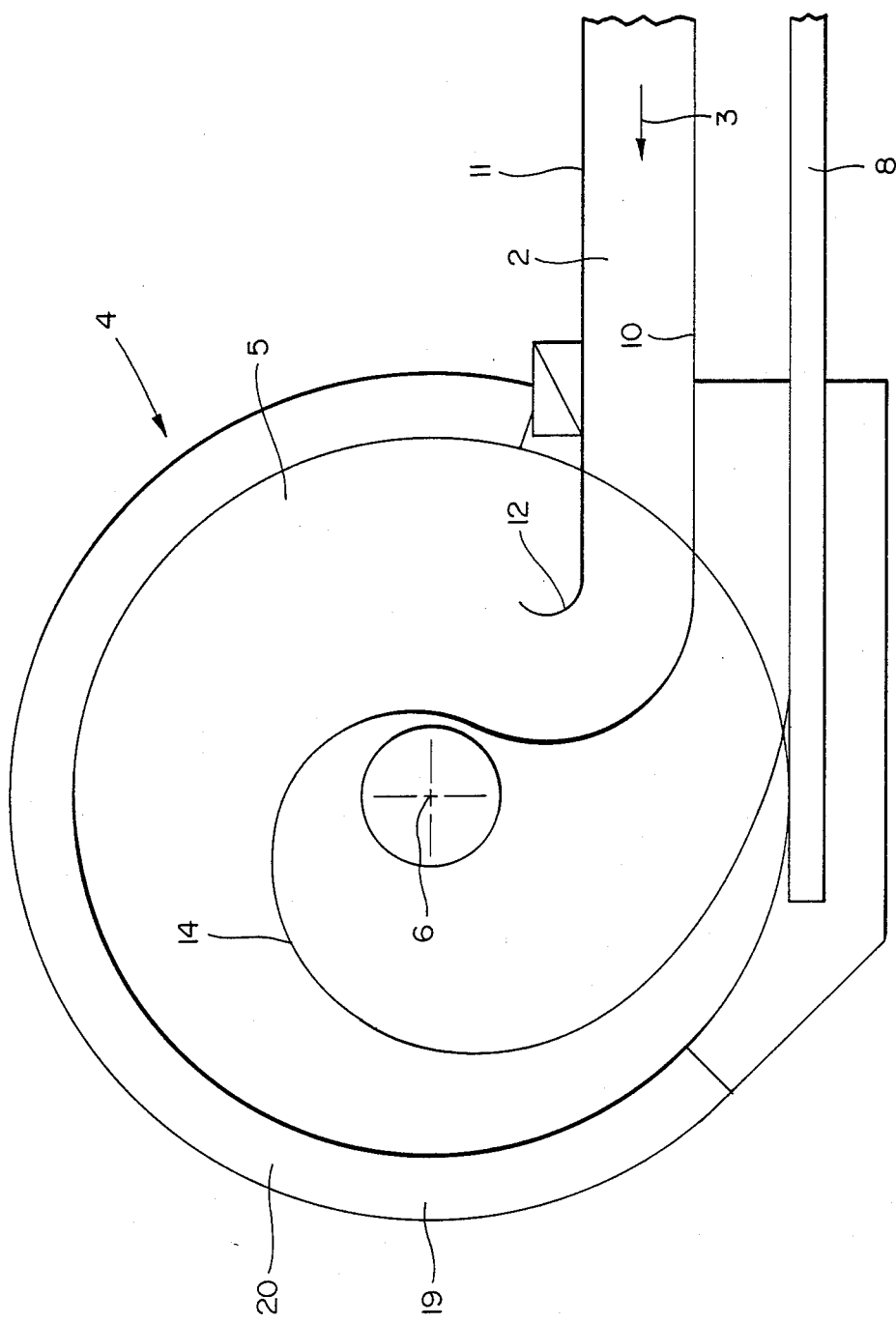

FIG. 3 shows the apparatus of FIG. 2 as seen from above. Parts identical to FIGS. 1 and 2 are provided with the same reference numerals so that they need not be described again.

Figure 4:
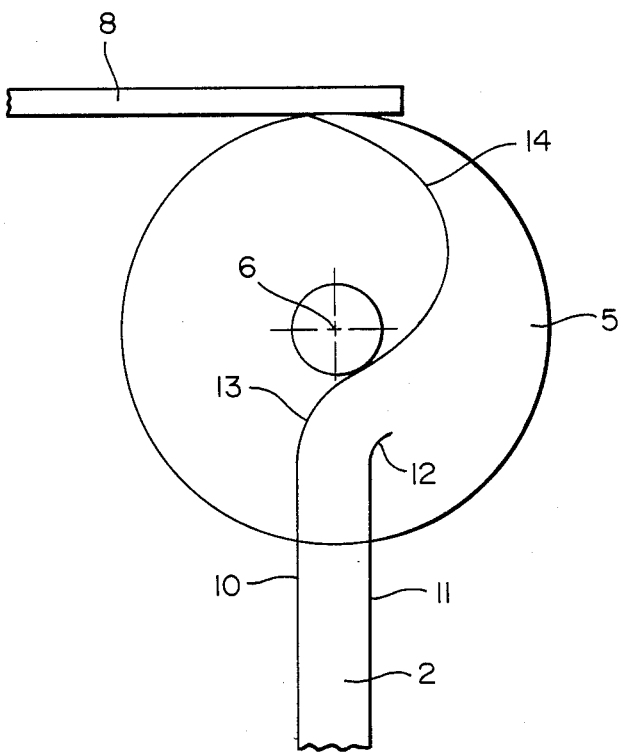

FIG. 4 shows a further apparatus according to the invention as viewed from above. Identical parts are again provided with the same reference numerals. The supply conveyor 2 extends rectilinearly in the radial direction towards the center point 6 of the disc 5. Accordingly, the arcs 12 and 13 extend over an angular region of only about 45°. The spiral 14 extends over an angular region of about 135°. Consequently, the supply conveyor 2 and the removal conveyor 8 do not extend parallel but at right-angles to each other.

Figure 5:
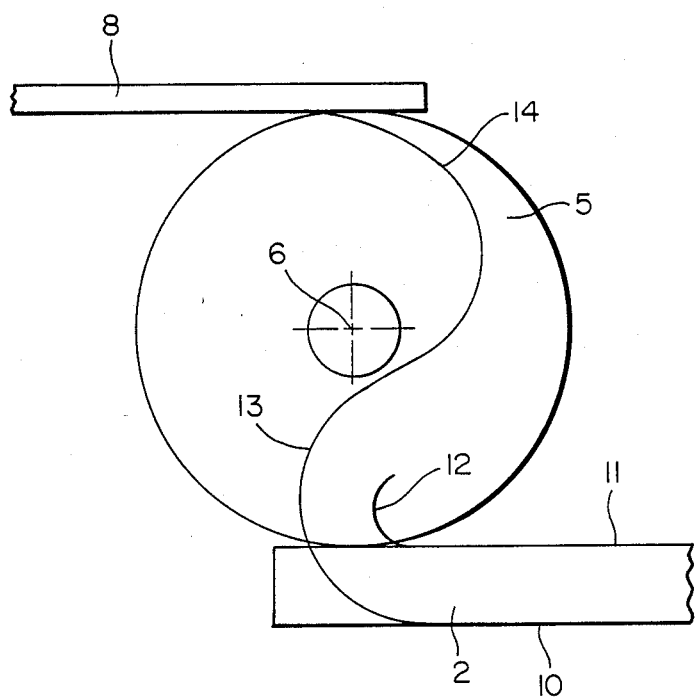

FIG. 5 shows a further possibility of implementing the apparatus according to the invention. The angular regions of the arcs 12, 13 and 14 and the positions of the supply conveyor 2 and removal conveyor 8 will be directly apparent from the drawing.

Figure 6:
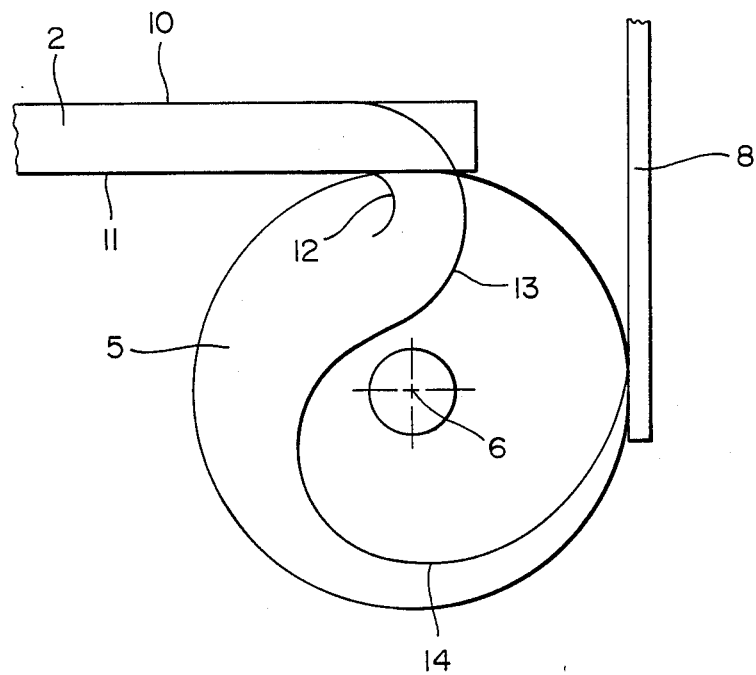
Figure 7:
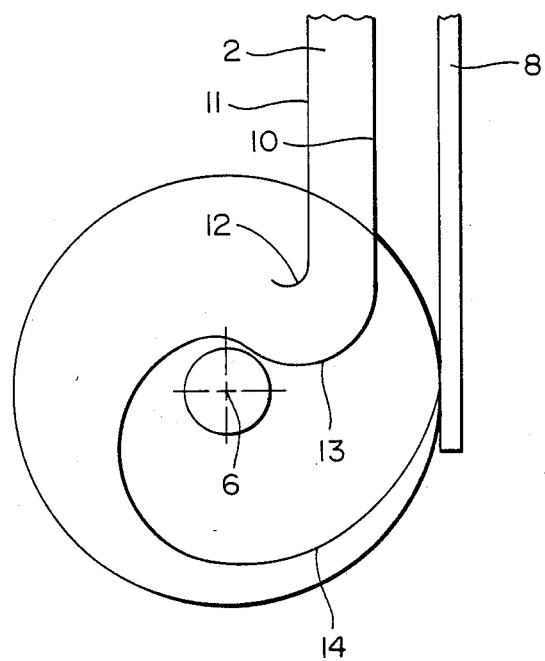

The same applies to the other alternatives of FIGS. 6 and 7.

I claim:

1. Apparatus for converting a multi-row stream of upright articles into a single row, comprising:
    a rectilinear supply conveyor provided with two parallel guide surfaces,
    an intermediate conveyor comprising a planar rotating disc,
    a removal conveyor, and
    a frame-fixed guide surface forming a spiral arc, said spiral arc having an originating point adjacent the center of said disc and extending spirally outwardly away from said originating point in a direction of the rotation of said disc, said spiral arc extending at least to the removal conveyor, one of said two parallel guide surfaces extending in an arc toward said originating point to merge with said spiral arc to form a continuous guide surface for guiding the articles from said supply conveyor to said rotating disc to said removal conveyor.

* * * * *